United States Patent [19]

Huang et al.

[11] Patent Number: 5,505,291

[45] Date of Patent: Apr. 9, 1996

[54] PACKAGE MEASURING SYSTEM AND ACCUMULATOR

[75] Inventors: Pao-Ter Huang, Edison, N.J.; Chunsheng Cai, New Fairfield, Conn.; Jaroslav Janik; John H. Lecko, both of Southbury, Conn.; James S. Morton, Danbury, Conn.

[73] Assignee: United Parcel Service of America, Inc., Atlanta, Ga.

[21] Appl. No.: 450,876

[22] Filed: May 26, 1995

Related U.S. Application Data

[63] Continuation of Ser. No. 199,071, Feb. 22, 1994.

[51] Int. Cl.⁶ ................................................. B65G 47/26
[52] U.S. Cl. ....................... 198/460.3; 198/572
[58] Field of Search ................... 198/444, 460.3, 198/572, 575, 502.2, 781.05–781.11

[56] References Cited

U.S. PATENT DOCUMENTS

| | | |
|---|---|---|
| 3,485,339 | 12/1969 | Miller et al. . |
| 3,612,248 | 10/1971 | Wallis .................. 198/781.09 |
| 3,817,368 | 6/1974 | Wentz et al. . |
| 3,822,009 | 7/1974 | Richards . |
| 3,960,262 | 6/1976 | Henig . |
| 4,419,384 | 12/1983 | Kane et al. . |
| 4,604,704 | 8/1986 | Eaves et al. . |
| 4,852,717 | 8/1989 | Ross et al. . |
| 5,201,397 | 4/1993 | Issacs . |
| 5,228,558 | 7/1993 | Hall . |

FOREIGN PATENT DOCUMENTS

| | | |
|---|---|---|
| 2816529 | 10/1979 | Germany . |
| 3738587 | 5/1989 | Germany . |

*Primary Examiner*—Joseph E. Valenza
*Attorney, Agent, or Firm*—Jones & Askew

[57] ABSTRACT

An apparatus is provided which provides measuring and accumulation of packages for downstream sorting or stacking. The apparatus provides variable force feeding of packages to reduce chaos accumulation. Reversing of conveyors allows for reduced line compression of packages for ease of removal. An ultrasonic measuring arch is also provided.

10 Claims, 9 Drawing Sheets

PACKAGE MEASURING SYSTEM AND ACCUMULATOR

This is a continuation of application Ser. No. 08/199,071, filed Feb. 22, 1994.

TECHNICAL FIELD

This invention relates in general to package accumulators and measuring devices. The invention particularly relates to package accumulators which accumulate packages for later overhead or side removal of the packages for their subsequent placement upon a pallet or other platform. This invention also particularly relates to devices for measuring package dimensions and weight for use in subsequent package handling.

BACKGROUND OF THE INVENTION

The prior art includes many devices which accept a inflow of boxes or other packages for subsequent dispersion onto pallets or platforms under a non-FIFO (first in first out) arrangement. For example, U.S. Pat. No. 3,960,262 to Henig discusses the need for closing gaps in a queue of packages, while preventing damage due to line pressure buildup.

U.S. Pat. No. 5,228,558 to Hall discusses the use of various zones of load carrying rollers, in which the speed of each zone is continuously adjusted based on the speed of its immediately proceeding zone. The use of drive rollers intermediate idler rollers is also discussed.

U.S. Pat. No. 3,817,368 to Wentz discloses a continuously moving sorting conveyor which arranges packages at a fixed center to center relationship regardless of package length.

U.S. Pat. No. 3,485,335 to Miller discloses the spacing of packages to make sure that only one package (regardless of its length) is on a weighing conveyor.

U.S. Pat. No. 3,822,009 to Richards discloses a transporting system which automatically varies the timing information required in detecting overload conditions, to recalibrate the system when its operating speeds are changed.

One problem in aligning random size and weight packages in linear contact accumulation is that when a wider package follows a narrower package, after contacting the wider one most of the time tends to rotate around the side of the narrower one. This usually results in disadvantageous distortion contact alignment, or chaos accumulation.

However, the prior art has not adequately provided an accumulator conveyor which discourages twisting of larger, second-in-line packages around smaller, first-in-line packages when both packages are side-justified against a common edge guide.

Furthermore, in the prior art, line pressure between packages on the accumulator conveyor tends to cause disadvantageous damage of the packages, and may discourage or prevent facilitate ready withdrawal of the packages from the accumulator conveyor due to binding of a packages. The prior art has also not adequately addressed this concern.

SUMMARY OF THE INVENTION

The present invention overcomes inadequacies in the prior an by providing an accumulator which controls package movement so as to discourage the packages from rotating, and encouraging them to maintain linear contact alignment. This results in less undesired rotation of the packages, and reduces line pressure between packages on the accumulator conveyor to reduce damage of the packages and to facilitate ready withdrawal of the packages from the accumulator conveyor. The present invention also overcomes inadequacies in the prior art by providing an improved method and apparatus for measuring dimensions and weights of packages for use in downstream processing.

Therefore, it is an object of the present invention to provide an improved package accumulator.

It is a further object of the present invention to provide an improved package measuring system.

It is a further object of the present invention to provide an improved package accumulator which is cost-efficient to build.

It is a further object of the present invention to provide an improved package accumulator which is cost-efficient to operate.

It is a further object of the present invention to provide an improved package accumulator which is cost-efficient to maintain.

It is a further object of the present invention to provide an improved package accumulator which is simple in operation.

It is a further object of the present invention to provide an improved package accumulator which is simple in construction.

It is a further object of the present invention to provide an improved package accumulator which is readily compatible with other package handling devices.

It is a further object of the present invention to provide an improved package accumulator which is reliable in operation.

It is a further object of the present invention to provide an improved package accumulator which may be operated with a minimum of operator oversight.

It is a further object of the present invention to provide an improved package accumulator which imparts minimal damage to the packages during their handling.

It is a further object of the present invention to provide an improved package accumulator which imparts minimal undesired rotation to the packages during their handling.

It is a further object of the present invention to provide an improved package accumulator which imparts improved alignment to the packages during their handling.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Referring is now made to the figures, where like numerals designate like objects throughout the several views.

General Construction and Operation

Figure 1:
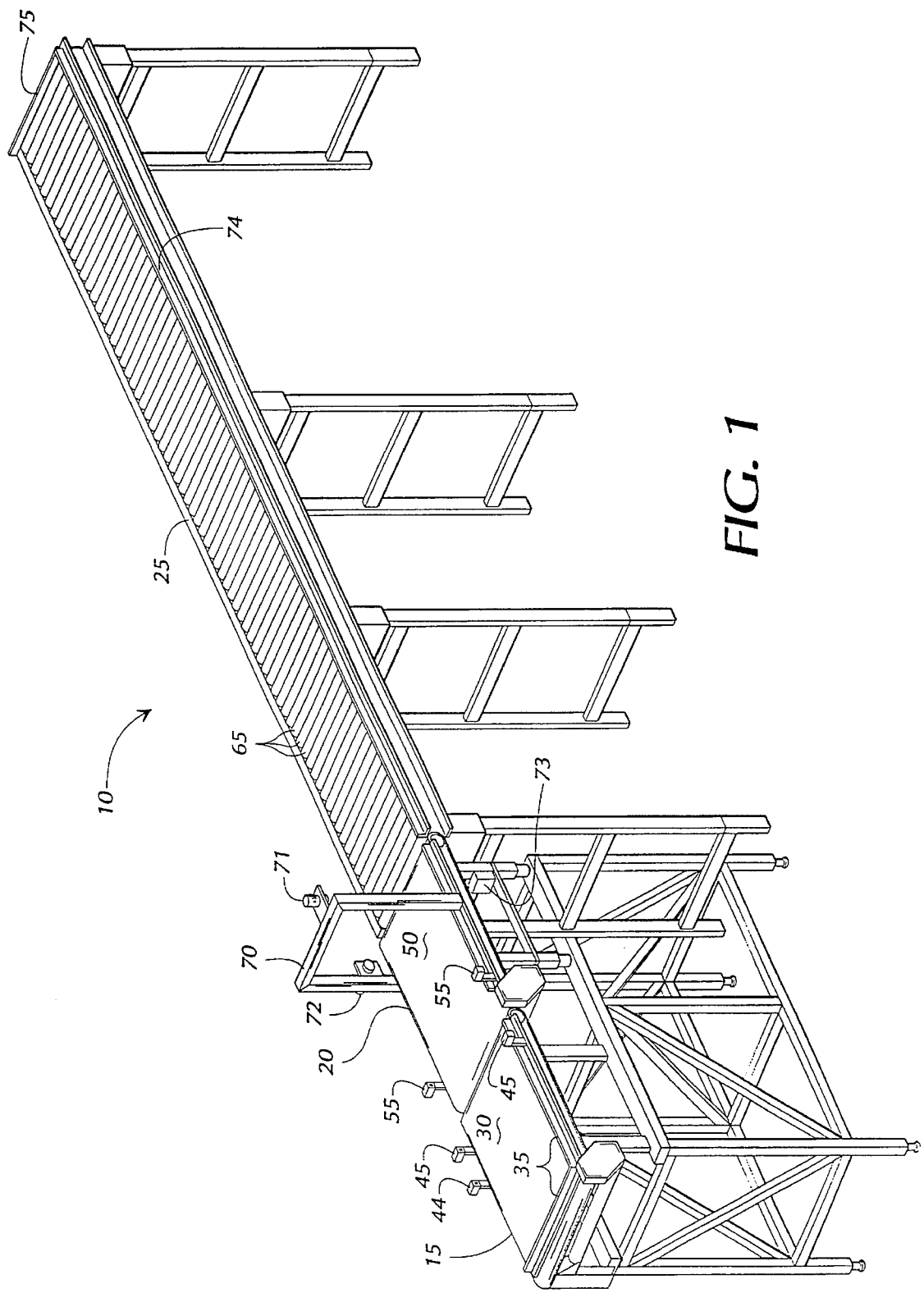
FIG. 1 is a pictorial view of a package accumulator system, shown without an ultrasonic dimensioning arch.
Figure 2:
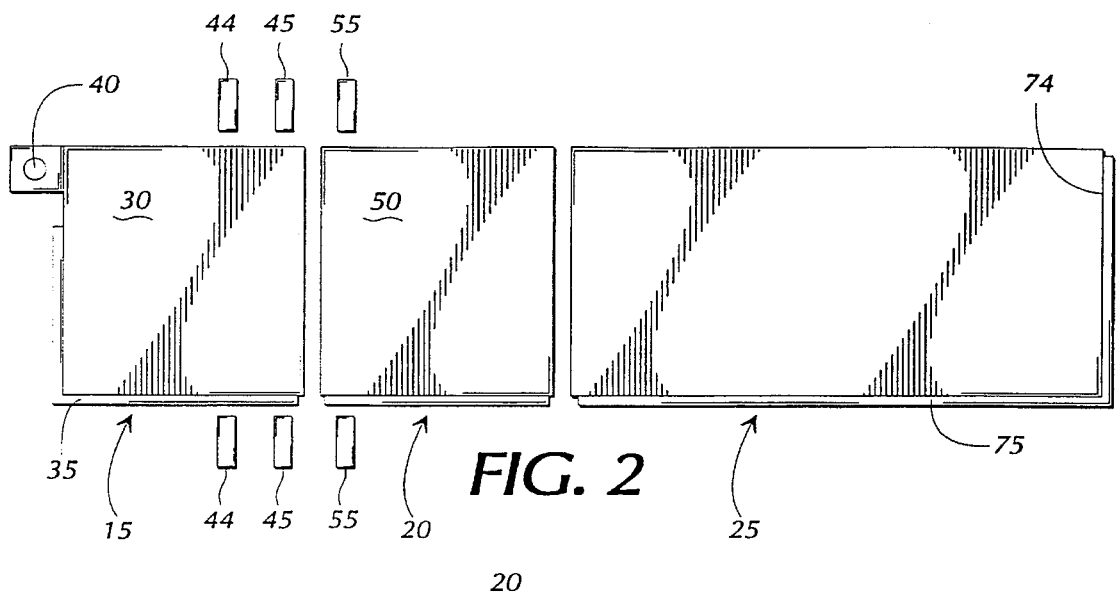
FIG. 2 is a top illustrative plan view of that shown in FIG. 1.

As illustrated in FIGS. 1 and 2, a preferred package accumulator 10 comprises an induction conveyor 15, a measuring conveyor 20, and an accumulator conveyor 25. Packages (also referred to as boxes in this discussion) or other objects are placed upon the induction conveyor 15, and are then transferred to the measuring conveyor 20, where the height, length, width and weight of each package is measured. The packages are then transferred to the accumulator conveyor 25. Packages may then be removed from the accumulator conveyor 25 in a non-FIFO (first in first out) manner, and may be transferred to a transport pallet or other platform.

Packages are fed from the measuring conveyor 20 to the accumulator conveyor 25 by variable distance feeding, in that the measuring conveyor also provides a variable amount of "push" to each package as it exits from the measuring conveyor 20 and is placed upon the accumulator conveyor 25.

This motion is assisted by the use of friction-driven rollers on the accumulator conveyor 25, with these friction-driven rollers regularly spaced between non-driven rollers for most of the length of the conveyor. The exception to the "spaced apart" rule is the existence of several consecutive power-driven rollers (three in one preferred embodiment) at the leading end of the accumulator conveyor.

More Detailed Discussion

FIGS. 1 and 2 illustrate a random size and weight package accumulator 10 constructed in accordance with the present invention. The package accumulator 10 is used as a buffer in a gantry loader or package sorting system. In one preferred embodiment, the packages are accumulated or stored in a linear array until a robot is commanded to move to the location of a particular package and pick it up for placement on a pallet or platform. Each package is preferably "side justified" against a rail on one side of the conveyor, and is preferably in contact with adjacent packages prior to removal.

Figure 3A:
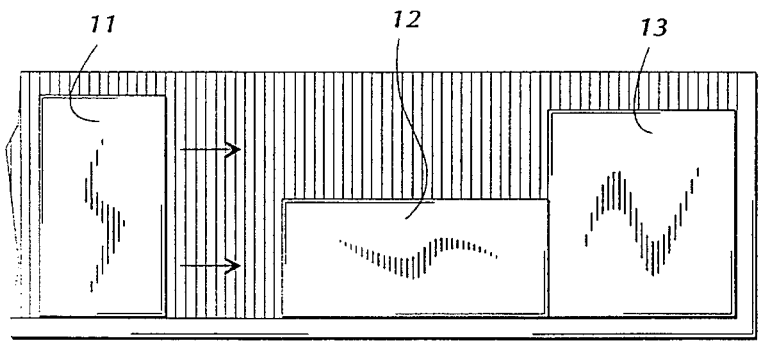
FIGS. 3A–3C are illustrative top plan view of view of packages placed upon a roller conveyor.
Figure 3B:
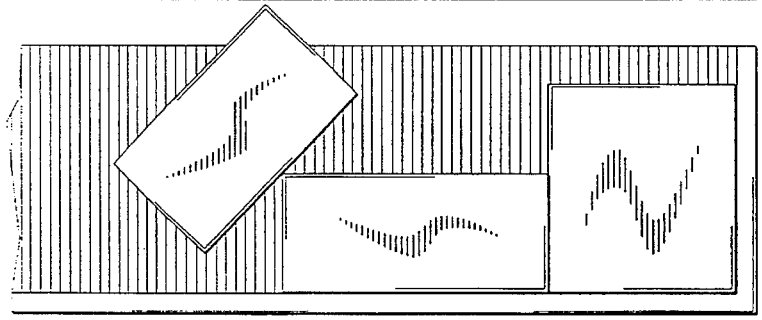
Figure 3C:
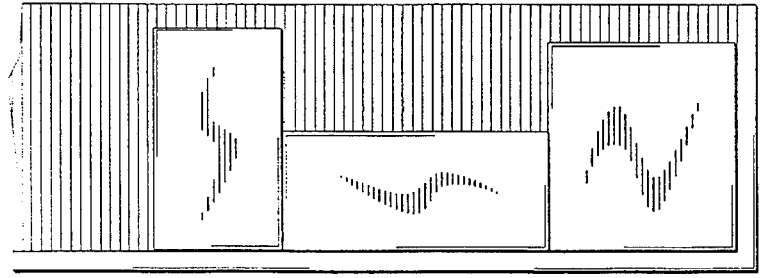

FIGS. 3A–3C illustrate a problem that is often encountered when attempting to align random size and weight packages in linear accumulation. FIGS. 3A–3C are top views of various sized packages moving along a conveyor assembly. The packages are aligned along an edge guide. As shown in FIG. 3B, when a wider package 11 follows a narrower package 12, its momentum, driving force, or both may cause it to rotate around a vertical edge of the narrower package when the two come in contact. This results in what the inventors refer to as a distorted contact alignment or a chaos accumulation. FIG. 3C illustrates the preferred manner in which random sized packages should be accumulated on the conveyor assembly.

The Induction Conveyor.

The induction conveyor 15 includes a motor driven conveyor belt 30 and positioning guide 35. The guide 35 allows for consistent and accurate placement of the packages upon the induction conveyor 15, and extends all the way onto a measuring conveyor (discussed later) and under a measuring arch (discussed later).

The induction conveyor 15 is configured to accept packages while its endless conveyor belt 30 is stationary. If a package is not on the measuring conveyor 20, a controller causes the package to be transferred from the induction conveyor 15 to the measuring conveyor 20, with both conveyors moving at synchronous speed for effective transfer. Automatic package introduction is also contemplated under the present invention.

Position sensors 45 are provided on each side of the induction conveyor belt 30 to determine when a package has moved from the induction conveyor 15 to the measuring conveyor 20. At that point, a controller will stop the conveyor belt 30 when the next package on the induction belt reaches package sensor 44.

In the preferred embodiment, the induction conveyor is a belt conveyor, such as a Dorner 3100 series end mount drive. The belt may be an endless Sparks Mono-Flex LWP 250 belt, with a SFL splice. However, other conveyor types may be used without departing from the spirit and scope of the invention.

The Measuring Conveyor

The measuring conveyor 20 includes a motor driven conveyor belt 50, load cells as known in the art (not shown) for weighing the packages, cofacing sensors 55 on opposite sides of belt 50, and an ultrasonic dimensioning arch.

While each package is passing along on belt 50, the weight of each package is determined by the load cells 73 (four in the preferred embodiment) positioned underneath the weighing conveyor 20.

While the package is moving on the measuring conveyor 20, the length of the package is determined by using the sensors 55 to measure the distance between the leading and trailing edges of the package as the package moves on to the measuring conveyor. As packages pass by, the computer records motor positions corresponding to when the sensors 55 are triggered on and off. Based on this process the length of the packages are derived. This information is passed to the host computer, for use in determining how far the package should be pushed onto the accumulator conveyor as discussed in detail further below. Other uses for this dimension may also be used in sorting or stacking the packages downstream of the accumulator conveyor 25.

Width and height measurements of the packages are provided by an ultrasonic dimensioning arch 70, while the packages are moving.

Figure 4:
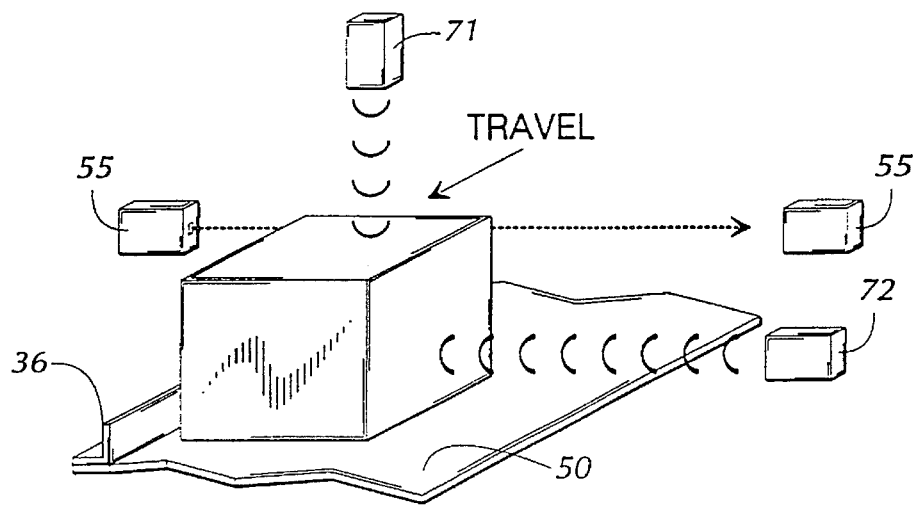
FIGS. 4 and 5 are illustrative views of the operation of an ultrasonic dimensioning arch according to the present invention.
Figure 5:
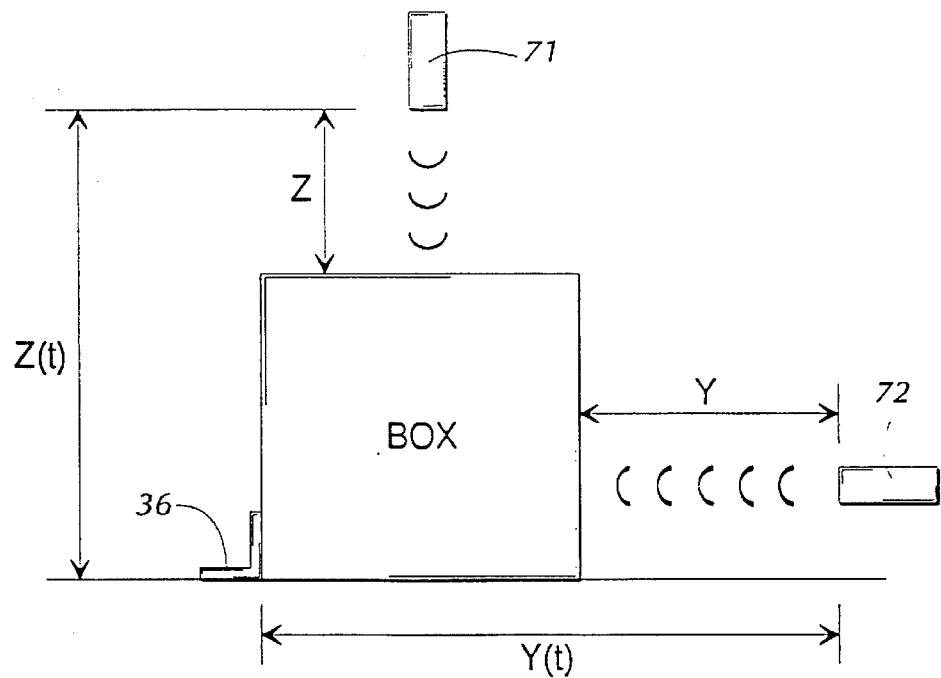

Referring now to FIGS. 4 and 5, a dimensioning arch includes a plurality of sensors that are used to determine the volume of a package as the package moves on the measuring conveyor belt 50. The arch includes two ultrasonic sensors for measuring the height and width of each package. The height is determined by "Z" sensor 71. The width is determined by "Y" sensor 72. Sensors 55 determine when the package enters the area adjacent the ultrasonic sensors. As previously discussed, the length of the package is determined by the assistance of sensors 55.

Figure 6:
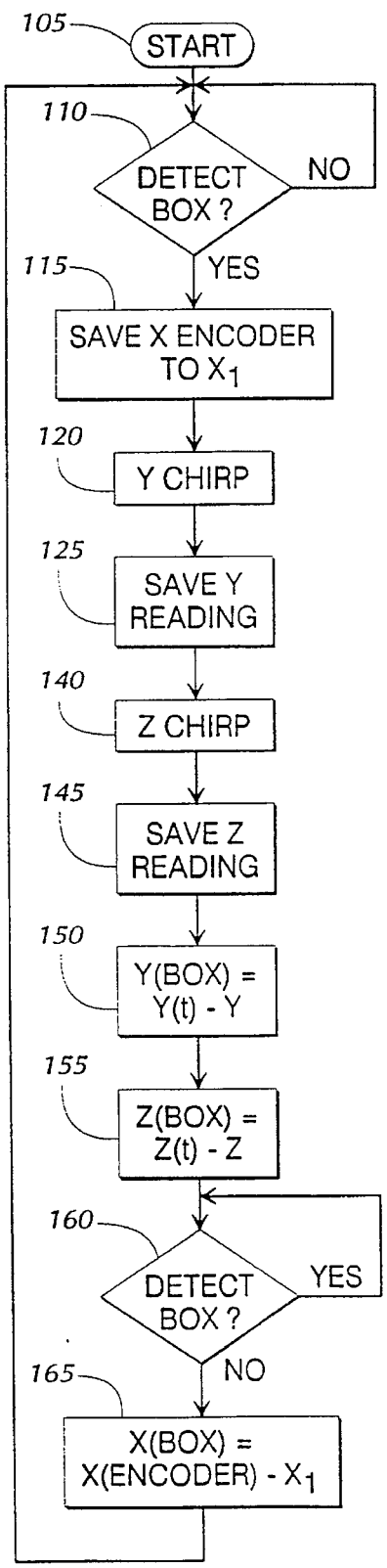
FIG. 6 is a flow diagram illustrating one process used in measuring packages according to the present invention.
Figure 7:
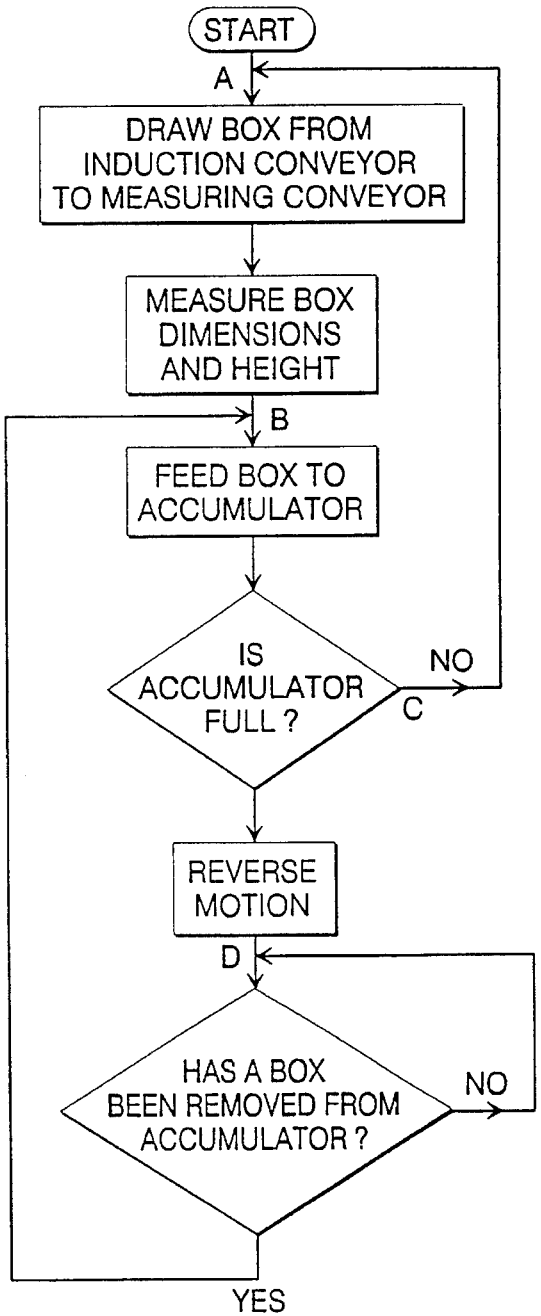
FIG. 7 is a flow diagram illustrating one process used in overall operation of the system according to the present invention.

Referring now to FIG. 6, the method 100 begins at step 105, where the system is initialized. At step 110, the controller determines whether the sensors 55 have detected the presence of a package. If the beam is not broken, the method loops back to step 110 until a package is detected. Once the beam is broken and a package is detected, the method proceeds to step 115, and records an encoder reading, for measuring the length of the package.

At step 120 the Y sensor 72 measures the distance between the sensor 72 and the side of the package. The Y reading is stored by the controller at step 125. At step 140, the Z sensor measures the distance from the sensor to the top of the package. The Z reading is stored at step 145.

At step 150, the controller uses the Y reading to calculate the width of the package. The width of the package equals the distance Y(t) between the package guide 35 and the sensor 72 (which is known by the controller) minus the Y reading. At step 155 the controller determines the height of the package by subtracting the Z reading from the known distance Z(t) between the belt 20 and Z sensor 71.

At step 160, the controller determines whether the package is still in the measuring zone. If the beam of the sensor 55 is still broken by the package, the method loops back to step 160. Once the package has moved past the photo sensor, the method continues to step 165, where the controller determines the length of the package using the data from the encoder 50. If there is room on the accumulator conveyor for another package, the package is transferred from the measuring conveyor 20 to the accumulator conveyor 25 and the controller turns off the conveyor belt 50.

It should be noted that it is suggested that the belt of the measuring conveyor have a high coefficient of friction with the packages to be handled by the system 10, to perform the pushing function discussed in further detail later in this discussion.

In an alternative embodiment (which is not shown), the length of the packages may be determined by using a second photo cell set instead of the encoder 50. By using two photo cell sets, the controller can determine the package velocity by measuring the time it takes the leading surface of the package to pass between the two sensors. The velocity may then be used to calculate the length by multiplying the velocity by the total time the package was seen by one of the photocells.

As discussed above, the weighing conveyor 20 may be a belt-type conveyor, such as a Dorner 3100 series end mount drive. The belt used should have a high coefficient of friction with the packages to be used, and may be an endless Sparks Mono-Flex LWP 250 belt, with a SFL splice.

The Accumulator Conveyor.

Referring now to FIGS. 1 and 2, the accumulator conveyor 25 includes a plurality of evenly spaced, parallel rollers 65, an edge guide 74 and an end stop 75. Several consecutive leading rollers 65 on the accumulator conveyor 25 are driven by a line shaft such as known in the art. Of the remaining rollers, every fourth roller is driven by the line shaft, although driving every third or second roller has also been found acceptable. The number of driven rollers is determined by the required amount of friction driving force to prevent undesirable package rotation as shown in FIG. 3.

As previously discussed, it is important that the packages not be allowed to rotate about each other after contact. This is provided by variable distance feeding, in that the measuring conveyor provides a variable amount in distance (depending on the length of package) of "push" to each package as it exits from the measuring conveyor and is placed upon the accumulator conveyor. This, combined with synchronized movement of the belt 50 and the powered rollers 65 provides sufficient force to ensure that the package moves to the desired position.

Prior to introducing a package onto the accumulator conveyor, a calculation is made of the length of packages on the accumulator conveyor 25. The computer subtracts the known length of the accumulator conveyor 25, and therefore can calculate the length of the space left vacant on the accumulator conveyor 25, such as space left by a package that has been removed from the accumulator by a robot (not shown) or by other means. It should be understood that any space left on the accumulator conveyor may not be a single space; it is possible that several spaces may be left on the accumulator conveyor. However, the above calculation should allow the computer to determine the sum of all of the gap lengths.

If there is room to place another package onto the accumulator conveyor 25, the measuring conveyor 20 and the powered rollers of the accumulator conveyor 25 energize such that the package moves from the measuring conveyor 20 to the accumulating conveyor 25. The amount of feed is the same distance as the length of the package. During this phase of package transfer, every power driven roller on the accumulator conveyor is operated, so a heavy package on the accumulator conveyor will move on its own, while lightweight packages on the accumulator conveyor are pushed by an upstream package.

If the controller determines that there is not enough room on the accumulator 25 for the next package, the package accumulator 10 will use the powered rollers and the package on the measuring conveyor 20 to ensure that the packages on the accumulator are pushed toward the end of the accumulator 25, with an additional tolerance. The tolerance is chosen as around 1". This is accomplished by operating all of the powered rollers on the accumulator, and by advancing the measuring conveyor belt 50.

In order to allow the packages to be removed from the queue by a robot or other means, it is important that the packages not be pressed together too tightly. This is achieved in the present invention by causing the driven rollers of the accumulator conveyor and the measuring conveyor belt to both reverse direction in synchronization once the packages are pushed together. These motions relax the compression among the packages on the accumulator conveyor, and thus prepare the packages to be removed from the accumulator.

In order to encourage packages on the accumulator conveyor to remain side-justified against the side guide 74 of the accumulator conveyor, the rotational axes of the rollers on the accumulator conveyor may be angled slightly from perpendicular to package travel. As is known in the art, this causes the rollers to cause packages thereon to be urged slightly against the guide as they move down their path on the accumulator conveyor 25.

As discussed above, the accumulator conveyor may be a line shaft conveyor as known in the art, such as a Matthews line shaft conveyor, model no. C1374, with 27" between frames.

Overall Operating Sequence of Accumulator Conveyor

The operating sequence may be summarized as follows:

a) The packages are positioned on the induction conveyor 15. If there is not a package on the measuring conveyor, the controller causes a package to be transferred to the measuring conveyor 20.

b) The measuring conveyor 20 measures the package length using the sensor 55. The length of the package is provided to the controller.

c) The controller has pre-knowledge of the accumulator conveyor length. The controller also records the length of each package on the accumulator conveyor. By performing a summation, the controller knows the total length of all the packages on the accumulator conveyor. The gap between the accumulator conveyor length and the cumulative package lengths is thus known.

d) If the length of the package on the measuring belt 50 is smaller than this gap, the package will be fed into the accumulator conveyor. A new package is then drawn from the induction belt to the measuring belt. This process repeats until the length of the package on the measuring belt is greater than the gap remaining on the accumulator conveyor.

e) During the package feeding from the measuring belt 50 to the accumulator conveyor 25, as discussed above some rollers are driven, while the remaining rollers are free rolling. The measuring belt and the accumulator conveyor operate at the same linear speed, and in a synchronized mode.

f) When the length of the package on the measuring belt is greater than the gap, the power driven rollers on the accumulator 25 and the measuring conveyor are operated in order to cause the remaining packages to be urged toward the end of the accumulator 25. The measuring belt 50 simultaneously feeds the package approximately one inch over the distance of the gap in order to ensure that all of the packages on the accumulator are pushed toward the end 75.

g) The measuring belt and the accumulator's power driven rollers are then synchronously reversed in the opposite direction. This results in the feeding package being reversed about 1 inch. In one preferred system, this slight reverse rotation is sufficient to relax the compression among the packages on the accumulator conveyor 25, and thereby prepare the packages for random pickup from the accumulator conveyor.

A number of specific examples will now be illustrated For purposes of this discussion, "full" is intended to mean that the last package on the accumulator conveyor is in contact with the measuring conveyor, with all packages on the accumulator conveyor being in line contact.

Figure 8:
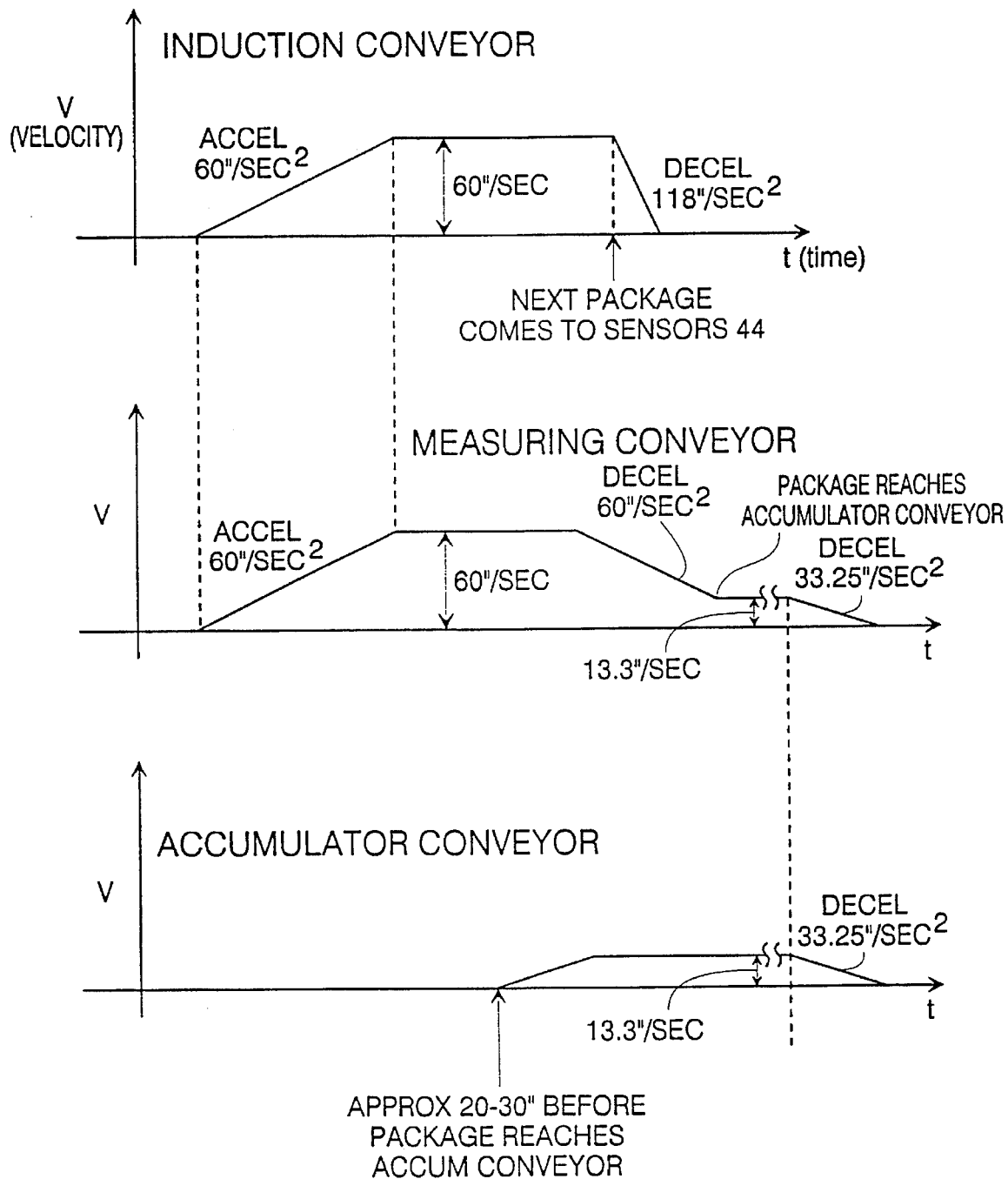
FIG. 8 is a time-velocity graph illustrating a first mode of operation of the overall system.

Referring now to FIG. 8, "case 1" is shown, in which a package is transferred from the induction conveyor to the accumulator conveyor, with the accumulator conveyor then not being "full". After a first package is placed on the conveyor, the induction conveyor and the measuring conveyor accelerate in synchronization to a constant speed. The induction conveyor maintains this speed until a second package reaches sensors 44, and the induction conveyor then decelerates. At a preset time after the package passes sensor 55, the measuring conveyor decelerates to a lesser speed, which is then kept constant. The package is then transferred to the accumulator conveyor, which is then running at the same speed as the measuring conveyor. The accumulator conveyor and the measuring conveyor then decelerate in synchronization to a stop.

Figure 9:
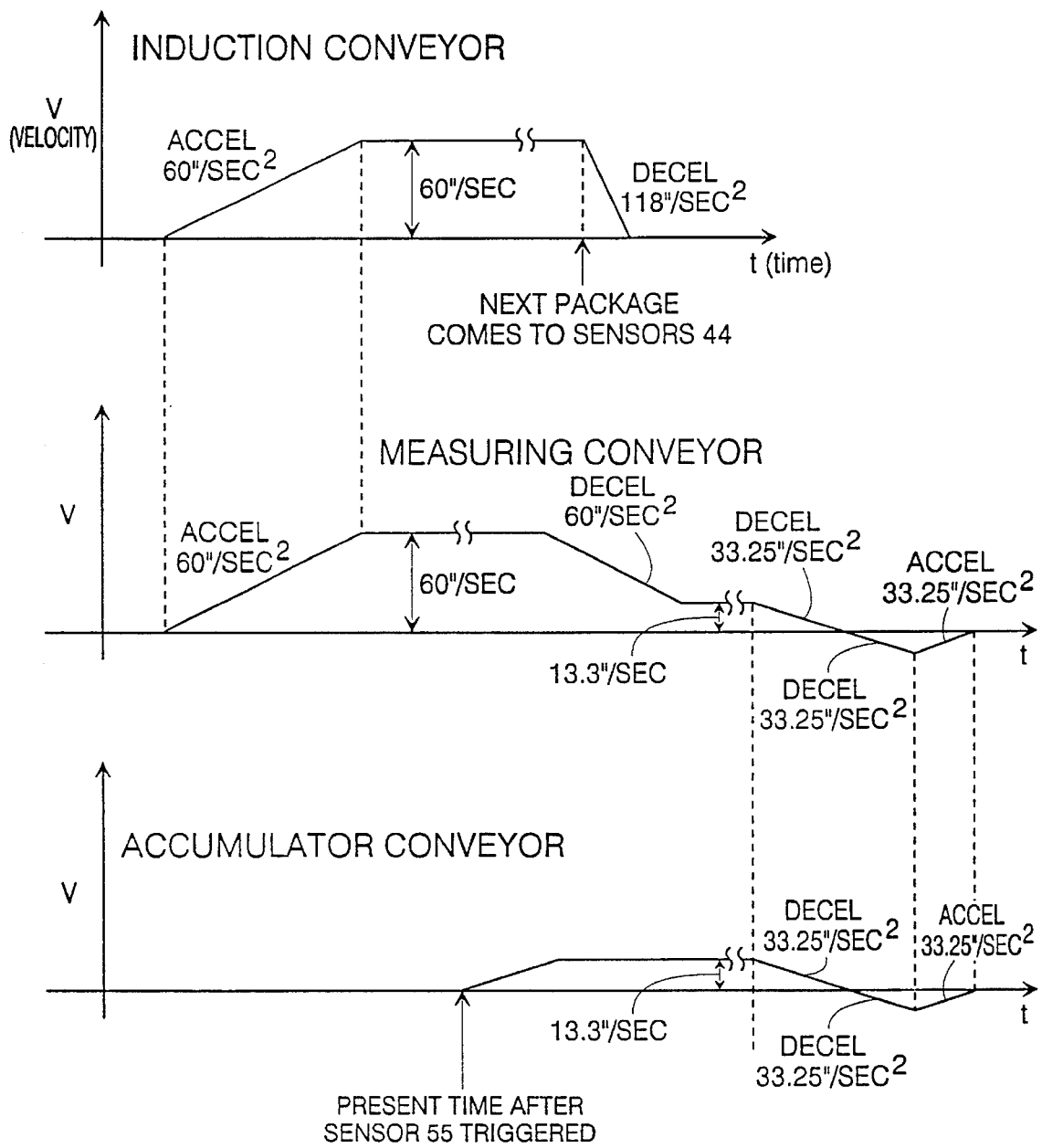
FIG. 9 is a time-velocity graph illustrating a second mode of operation of the overall system.

Referring now to FIG. 9, "case 2" is shown, in which a package is transferred from the induction conveyor to the accumulator conveyor, with the accumulator conveyor then being "full". The reversal is approximately 0.35 seconds in total.

Figure 10:
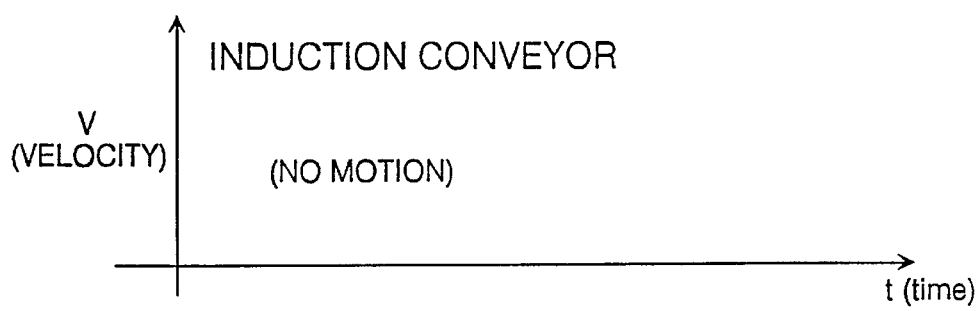
FIG. 10 is a time-velocity graph illustrating a third mode of operation of the overall system.
Figure 10:
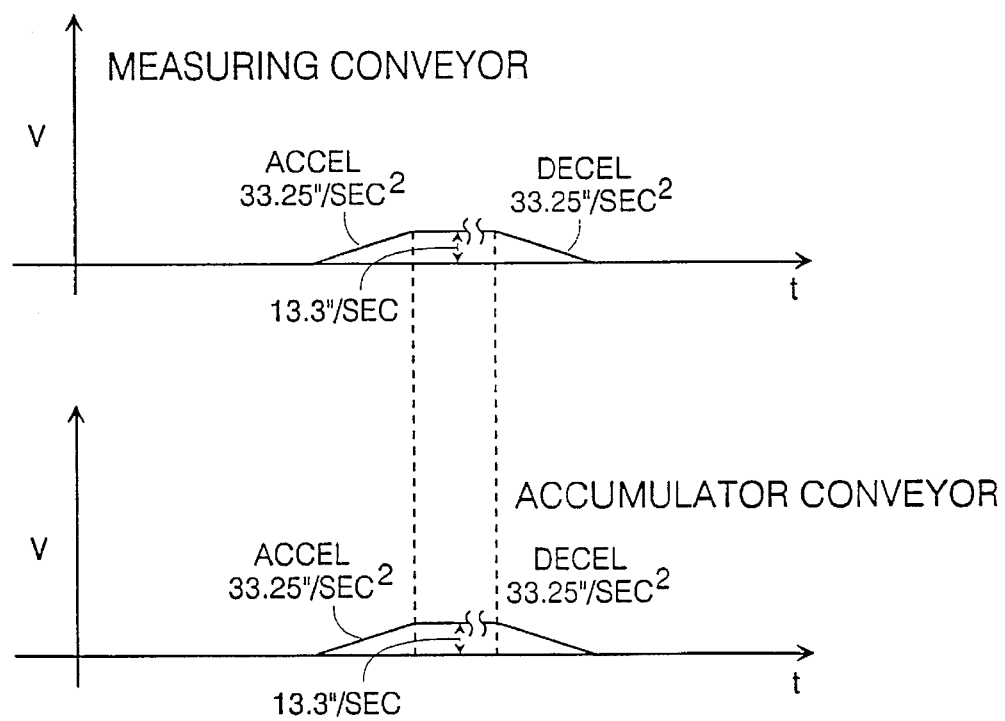

Referring now to FIG. 10, "case 3" is shown, in after the accumulator is filled, a package is removed, but the next available package will not fill the accumulator conveyor.

Figure 11:
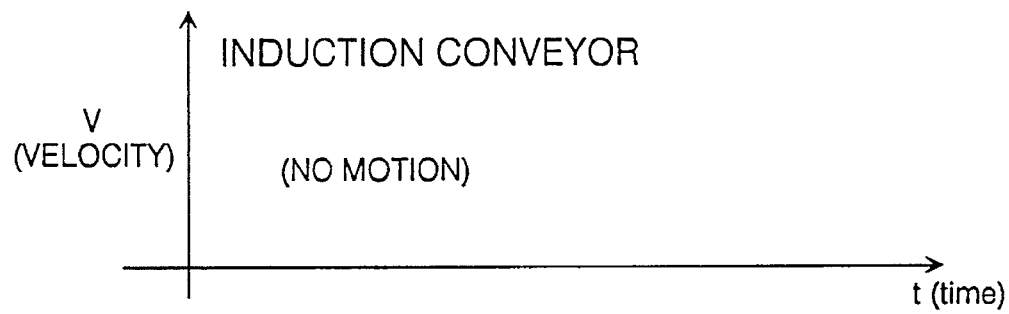
FIG. 11 is a time-velocity graph illustrating a fourth mode of operation of the overall system.
Figure 11:
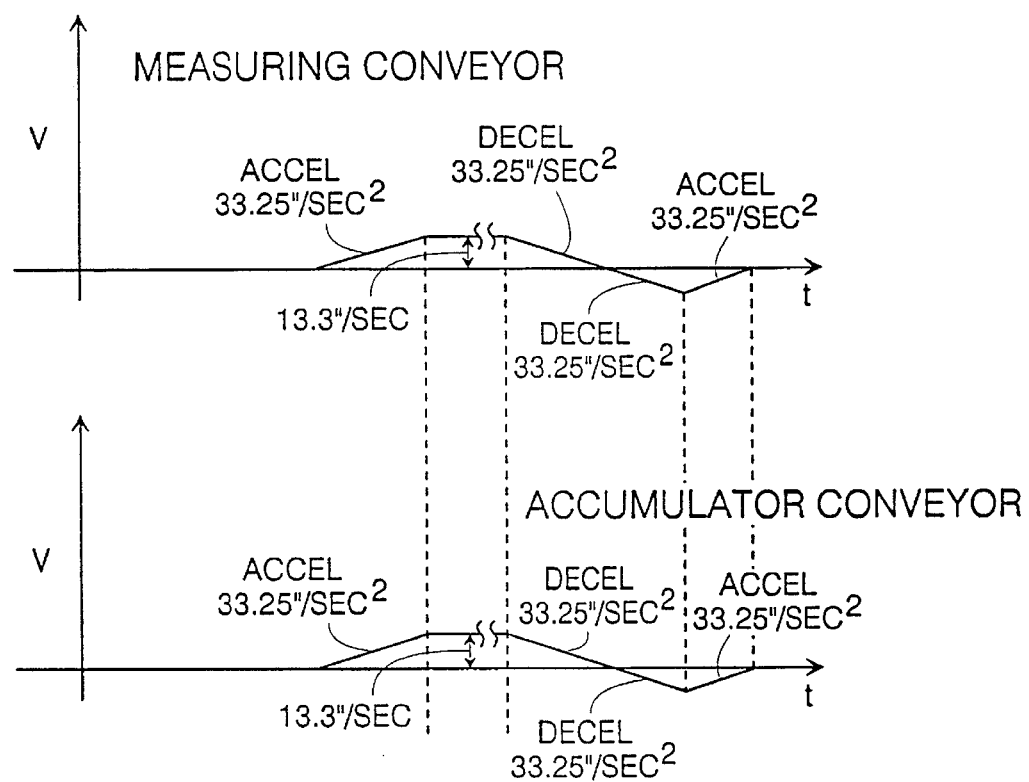

Referring now to FIG. 11, "case 4" is shown, in after the accumulator is filled, a package is removed, and the next available package will fill the accumulator conveyor. The total time of reversal is approximately 0.35 seconds, or as long as necessary to move the conveyors one inch in reverse.

Computer System Setup

Figure 12:
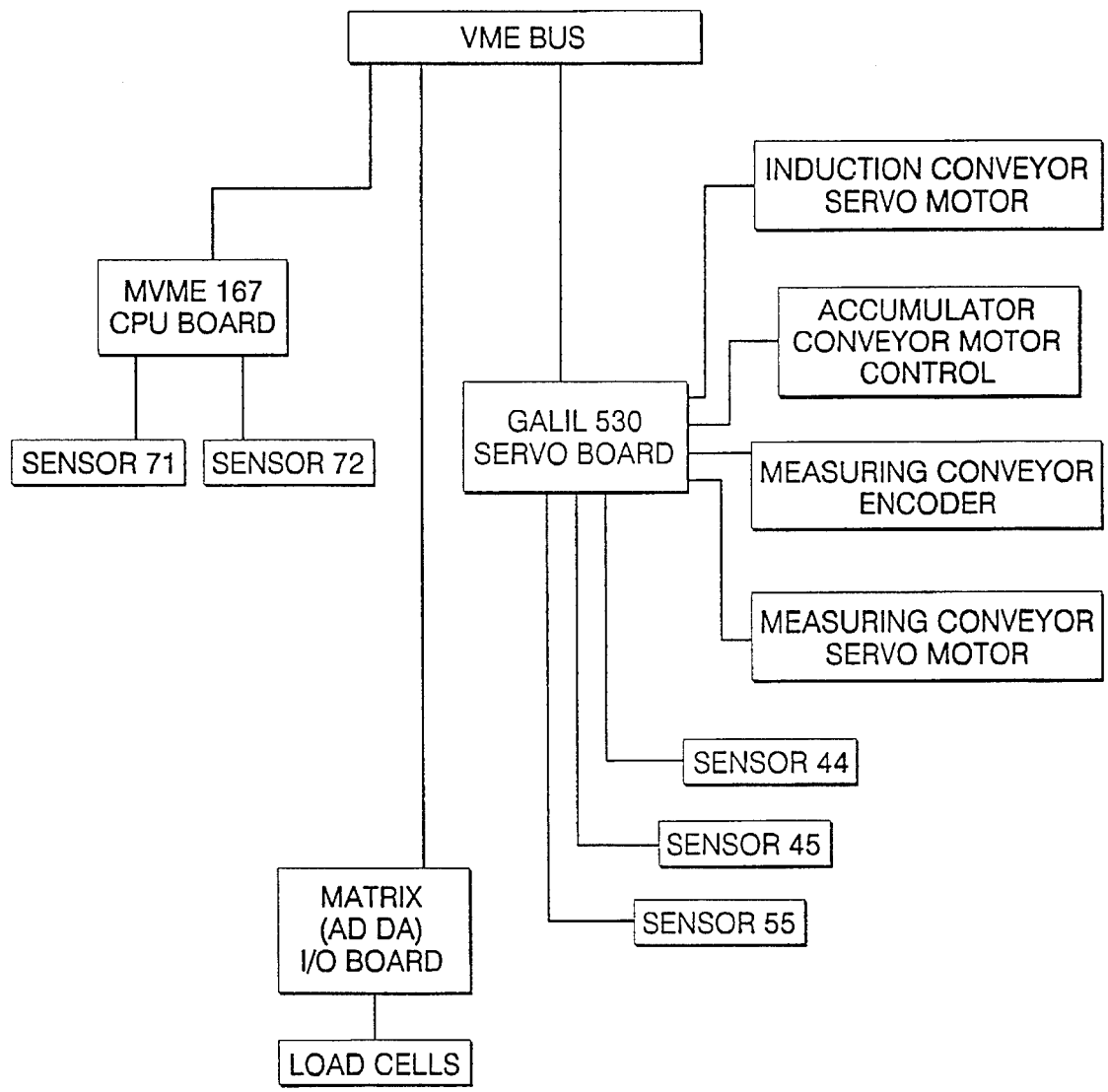
FIG. 12 illustrates interaction of various computer, sensor, and other elements of the invention.

Referring now to FIG. 12, a servo board controls the motion of motors on measuring belt and rollers of accumulator conveyor. A host computer runs application software and supervises a servo board. In one experiment implementation, the servo board chosen is Galil 500 series board. The host computer is a Motorola MVME167 single board computer. The host computer runs the accumulator control software and other application software, such as stacking algorithms, robot control, etc. The Galil servo board runs motor control and I/O operation code. For controlling the package measuring system and the accumulator, force feeding, a PC has been found sufficient.

The host computer has the pre-knowledge of accumulator conveyor length. The host computer also records length of each package on the accumulator conveyor. Performing a summation, the host computer knows the accumulative length of all the packages on the accumulator conveyor. The gap between the accumulator conveyor length and accumulative package length is thus known.

Sensor Types

The sensors 44, 45, and 55 are photoelectric sensors, such as those made by Banner, models SM31E (emitter) and SM31R (receiver). Sensors 71, 72 are ultrasonic sensors, such as those made by Senix, model Ultra-U.

Alternatives

The measuring belt is one way of achieving position controlled feeding, it can also be implemented as a computer controlled mechanical push bar, or equivalent.

Power driving on rollers in accumulator conveyor can be replaced by gravity force. Tilting accumulator conveyor with the feeding end higher than the other end, the same results have been experimentally achieved. During gravity force driving, heavy packages tend to move on its own, while lightweight packages may get stuck on the accumulator conveyor. Those packages are pushed forward by feeding packages.

The width of the packages may alternately be determined by the use of two ultrasonic sensors, if side justification against a guide is not possible or desired.

For the purposes of measuring package length, belt speed and travel of the measuring or induction conveyor may be done by an encoder reading of a drive roller mounted to a shaft, or alternatively may be done by use of a measuring wheel (not shown) itself fixed to a supporting shaft. The wheel should be in frictional contact with the surface of the belt, and an encoder reading may be taken from the supporting shaft.

It should be understood that although much of the discussion herein relates to packages, it should be understood that the present invention may also related to the handing of other objects.

While this invention has been described in specific detail with reference to the disclosed embodiments, it will be understood that many variations and modifications may be effected within the spirit and scope of the invention as described in the appended claims.

What is claimed is:

1. A method of accumulating a plurality of packages, comprising the steps of:

a) measuring the length of each of said plurality of packages;

b) urging each of said packages onto an accumulator conveyor having a known length from an end stop, the distance of said urging relating in direct proportion to the length of said package being urged to said accumulator; and c) urging said plurality of packages into an abutting relationship against said end stop after they are on said accumulating conveyor.

2. The method as claimed in claim 1, wherein said urging in step "b" is at least partly provided by a belt conveyor upstream of said accumulator conveyor.

3. The method as claimed in claim 1, wherein said urging in the step "b" is at least partly provided by at least one powered roller proximate the leading end of said accumulator conveyor.

4. The method as claimed in claim 1, wherein said urging in step "b" is at least partly provided by a powered portion of said accumulator conveyor proximate the leading end of said accumulator conveyor.

5. The method as claimed in claim 1, wherein said urging in step "b" is at least partly provided by a combination of a belt conveyor upstream of said accumulator conveyor, and at least one powered roller proximate the leading end of said accumulator conveyor.

6. An apparatus for accumulating a plurality of packages, said apparatus comprising:
  a) means for measuring the length of each of said plurality of packages;
  b) an accumulator conveyor having one closed end and one open end;
  c) means for urging each of said packages onto the open end of said accumulator conveyor a distance directly proportional to the length of the particular package being urged onto the accumulator conveyor; and
  d) means for urging said plurality of packages into an abutting relationship after they are on said accumulator conveyor.

7. The apparatus as claimed in claim 6, wherein said accumulator conveyor is a roller conveyor.

8. The apparatus as claimed in claim 6, wherein said urging means in element "c" is at least partially provided by a belt conveyor upstream of said accumulator conveyor.

9. A method of accumulating a plurality of packages, comprising the steps of:
  a) measuring the length of a first package;
  b) urging said first package onto an accumulator conveyor having an end stop and also having a known length relative to said stop for accumulating packages;
  c) urging subsequent packages on said accumulator conveyor until the summed length of packages on said accumulator conveyor is sufficient to prevent the introduction of a final package; and
  d) urging packages already on said accumulator conveyor onto line contact by pushing said final package with the aid of a force external to said accumulator conveyor.

10. The method as claimed in claim 9, wherein said packages are urged onto said accumulator conveyor by a second conveyor upstream of said accumulator conveyor, and wherein said step "d" is accomplished by said second conveyor urging said final package partly onto said accumulator conveyor and into contact with the most upstream package completely on said accumulator, such that said final package provides said urging set forth in step "d".

* * * * *